(12) United States Patent
Kim et al.

(10) Patent No.: US 8,027,010 B2
(45) Date of Patent: Sep. 27, 2011

(54) LIQUID CRYSTAL DISPLAY DEVICE AND METHOD OF MANUFACTURING THE SAME

(75) Inventors: Kyeong Jin Kim, Daegu-si (KR); Byung Gun Ahn, Busan-si (KR)

(73) Assignee: LG Display Co., Ltd., Seoul (KR)

( * ) Notice: Subject to any disclaimer, the term of this patent is extended or adjusted under 35 U.S.C. 154(b) by 1173 days.

(21) Appl. No.: 11/641,001

(22) Filed: Dec. 19, 2006

(65) Prior Publication Data

US 2007/0188696 A1    Aug. 16, 2007

(30) Foreign Application Priority Data

Feb. 15, 2006 (KR) .................. 10-2006-0014442

(51) Int. Cl.
*G02F 1/1339* (2006.01)
(52) U.S. Cl. ........ 349/156; 349/106; 349/110; 349/117
(58) Field of Classification Search .................. 349/155, 349/156, 110, 106, 153, 141, 139, 138, 117
See application file for complete search history.

(56) References Cited

U.S. PATENT DOCUMENTS

| 6,864,946 | B2 * | 3/2005 | Kim ............................. 349/156 |
| 6,897,920 | B2 * | 5/2005 | Lee et al. ...................... 349/110 |
| 6,975,379 | B2 * | 12/2005 | Kim et al. .................... 349/155 |
| 7,286,199 | B2 * | 10/2007 | Moriya ......................... 349/117 |
| 2003/0071956 | A1 * | 4/2003 | Sasaki et al. ................. 349/155 |
| 2005/0157234 | A1 * | 7/2005 | Park ............................. 349/117 |

FOREIGN PATENT DOCUMENTS

| JP | 4-068314 | 3/1992 |
| JP | 9-043616 | 2/1997 |
| JP | 10-186374 | 7/1998 |
| JP | 2005-165239 | 6/2005 |
| JP | 2005-321495 | 11/2005 |

* cited by examiner

*Primary Examiner* — Thoi Duong
(74) *Attorney, Agent, or Firm* — McKenna Long & Aldridge, LLP.

(57) ABSTRACT

A liquid crystal display (LCD) device and a method of manufacturing the same that can improve the picture quality are provided. A liquid crystal display device includes: a first substrate; a black matrix formed in a matrix configuration on the first substrate; a compensation layer disposed above the black matrix and including a plurality of compensation patterns separated a predetermined region from each other where the compensation layer has been removed; and a column spacer disposed in a region including at least the predetermined region.

12 Claims, 11 Drawing Sheets

LIQUID CRYSTAL DISPLAY DEVICE AND METHOD OF MANUFACTURING THE SAME

This application claims the benefit of Korean Patent Application No. 10-2006-0014442, filed on Feb. 15, 2006, which is hereby incorporated by reference for all purposes as if fully set forth herein.

BACKGROUND OF THE INVENTION

1. Field of the Invention

The present invention relates to a liquid crystal display device, and more particularly, to a liquid crystal display device including a compensation layer formed on an inner surface of a substrate and a method of manufacturing the same.

2. Discussion of the Related Art

With the development of modern information and communication technologies, liquid crystal display (LCD) devices having high brightness, large-sized screens, low power consumption and low price are in demand.

The LCD device includes first and second substrates having first and second electrodes, respectively that are attached such that the first electrode faces the second electrode, and a liquid crystal layer interposed between the first and second substrates. The LCD device displays an image using light transmittance that is changed when liquid crystal molecules are moved by an electric field generated by applying a voltage between the first and second electrodes.

Because the liquid crystal is optically an anisotropic material having an ordinary refractive index and an extra-ordinary refractive index, it has characteristics where the light path and birefringence vary depending on an incident angle of light. When the light emitted from a backlight is linearly polarized through a lower polarizing film of a liquid crystal panel and then passes through the liquid crystal having the optical anisotropy in a direction (case I) perpendicular to the liquid crystal cell and at a predetermined angle (case II) with respect to the liquid crystal cell, retardation values in cases I and II are different, and thus a phase difference is generated. As a result, the characteristics of light passing through the liquid crystal in the cases I and II are different according to the viewing angle.

Therefore, the related art LCD device has a low visibility due to a variation of contrast ratio and gray scale inversion, that are characteristics determining how clearly an image is seen.

The above problem can be overcome by compensating the optical phase difference generated in the liquid crystal cell, thereby enhancing the viewing angle. Therefore, a compensation film that can compensate for the optical phase difference is attached on a substrate to enhance the viewing angle.

However, when the compensation film is attached on the substrate, foreign particles may adhere to the compensation film. Also, the attached compensation film limits reducing the thickness of the liquid crystal panel. To solve these problems, there has been research into a compensation layer for compensating the optical phase difference formed on an inner surface of the substrate to thereby prevent foreign particles from adhering and decreasing the thickness of the liquid crystal panel.

The compensation layer is formed on the entire inner surface of the substrate, and a column spacer for maintaining a cell gap between two substrates is formed on the compensation layer. Because the compensation layer is formed of a weak material with a weak restoring force, any pressure applied to the LCD device causes the column spacer to compress the compensation layer. Thereafter, when the pressure is released, the compensation layer does not return to its original state and thickness due to its weak restoring force. Therefore, the cell gap between two substrates decreases, which may result in a blemish.

Also, because the compensation layer is formed on the entire inner surface of the substrate, a seal pattern disposed along edges of the LCD device is formed on the compensation layer. However, because an adhesive force between the compensation layer and the seal pattern is very weak, a defect, such as a seal pattern burst may occur.

SUMMARY OF THE INVENTION

Accordingly, the present invention is directed to a liquid crystal display device and method for manufacturing the same that substantially obviates one or more of the problems due to limitations and disadvantages of the related art.

An advantage of the present invention is to provide a liquid crystal display device and a method of manufacturing the same that may enhance the viewing angle and decrease contamination due to foreign particles by forming a compensation layer on an inner surface of a substrate.

Another advantage of the present invention is to provide a liquid crystal display device and a method of manufacturing the same that may reduce the thickness of the liquid crystal display device by forming a compensation layer on an inner surface of a substrate.

Another advantage of the present invention is to provide a liquid crystal display device and a method of manufacturing the same that may maintain the cell gap between two substrates by removing a portion of a compensation layer corresponding to a column spacer.

Another advantage of the present invention is to provide a liquid crystal display device and a method of manufacturing the same that may prevent a seal pattern burst by removing a portion of compensation layer corresponding to a seal pattern region.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes: a first substrate; a black matrix formed in a matrix configuration on the first substrate; a compensation layer disposed above the black matrix and including a plurality of compensation patterns separated a predetermined region from each other where the compensation layer has been removed; and a column spacer disposed in a region including at least the predetermined region.

In another aspect of the present invention, a liquid crystal display device includes: a first substrate; a black matrix formed in a matrix configuration on the first substrate; a compensation layer disposed above the black matrix and including a plurality of compensation patterns separated by a predetermined region from each other where the compensation layer has been removed; a column spacer disposed in a region including at least the predetermined region; a second substrate disposed facing the first substrate; and a liquid crystal layer interposed between the first substrate and the second substrate, wherein the second substrate includes a pixel electrode and a common electrode alternately arranged thereon.

In still another aspect of the present invention, a liquid crystal display device includes: a first substrate; a black matrix formed in a matrix configuration on the first substrate; a compensation layer disposed above the black matrix and including a plurality of compensation patterns separated by a predetermined region from each other where the compensation layer has been removed; a common electrode formed on the first substrate including the compensation patterns; a column spacer formed on the common electrode corresponding to the black matrix; a second substrate disposed facing the first substrate; and a liquid crystal layer interposed between the first substrate and the second substrate, wherein the second substrate includes a pixel electrode formed thereon.

In yet another aspect of the present invention, a method of manufacturing a liquid crystal display device, includes: forming a black matrix in a matrix configuration on a first substrate; forming a compensation pattern including a plurality of compensation patterns separated by a predetermined region from one another on the black matrix where the compensation layer has been removed; and forming a column spacer on the first substrate including the predetermined region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE ILLUSTRATED EMBODIMENTS

Reference will now be made in detail to an embodiment of the present invention, examples of which is illustrated in the accompanying drawings.

Figure 1:
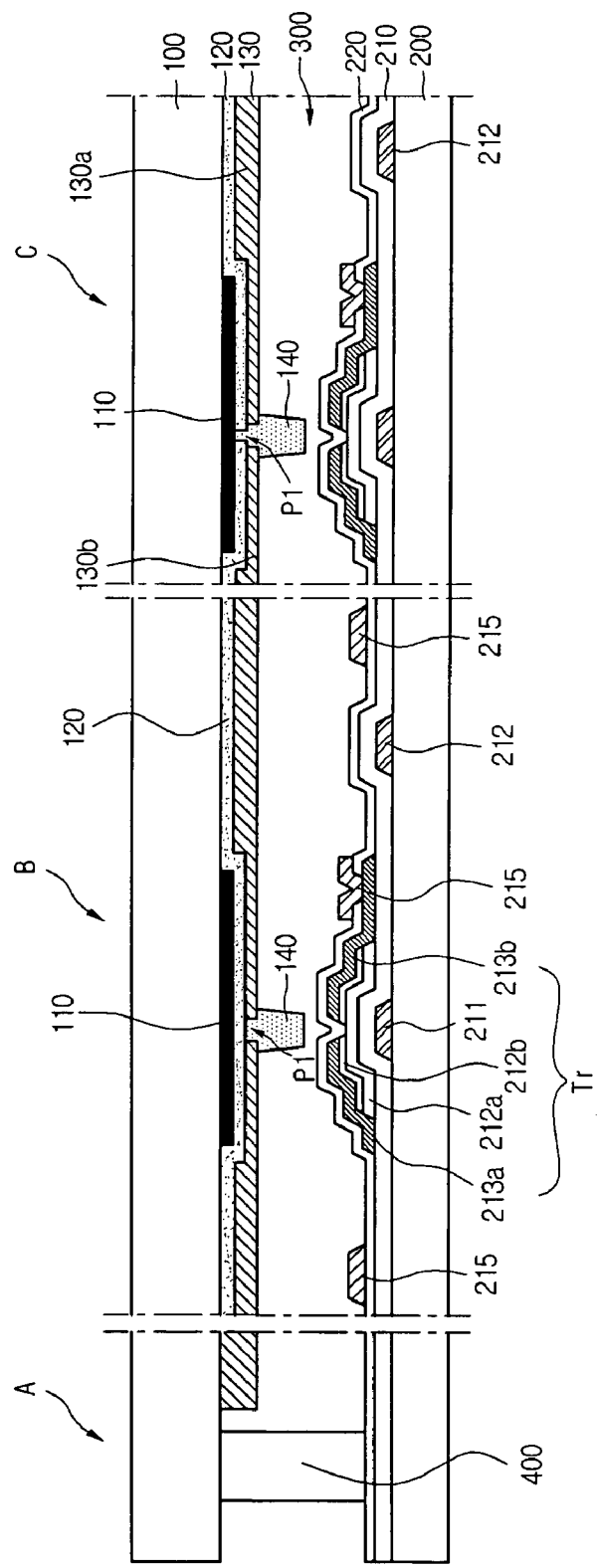
FIG. 1 is a sectional view of an IPS mode LCD device according to a first embodiment of the present invention.

FIG. 1 is a sectional view of an IPS mode LCD device according to a first embodiment of the present invention.

Referring to FIG. 1, first and second substrates 100 and 200 are spaced apart by a predetermined distance from each other, and a liquid crystal layer 300 is interposed between the first and second substrates 100 and 200. A seal pattern 400 is formed in an edge region (i.e., seal pattern region, 'A') of the first and second substrates 100 and 200. The first and second substrates 100 and 200 are attached to each other by the seal pattern 400.

On an inner surface of the first substrate 100 are formed a black matrix 110 and a color filter layer 120.

The black matrix 110 is arranged in a matrix configuration corresponding to a non-transmission region of the second substrate 200. The non-transmission region includes gate lines and a data lines defining pixel regions of the second substrate 200, thin film transistors formed at a crossing of the gate line and the data line, and the edge region 'A'.

The color filter layer 120 is formed corresponding to a transmission region of the second substrate 200. The transmission region includes a plurality of pixel regions defined by the gate lines and the data lines. The color filter layer 120 has different colors corresponding to the respective pixel regions. The color filter layer 120 is formed corresponding to the pixel regions and is also formed partially overlapping the black matrix 110 on the black matrix 110. Accordingly, the color filter layer 120 on the black matrix 110 can be divided into first color filter layer and second color filter layer separated by a predetermined distance from each other that is shown in region 'C' of FIG. 1.

As shown in region 'B' of FIG. 1, when the color filter layer 120 is arranged in a striped configuration, the color filter layer 120 on the black matrix 110 has the same color and thus the color filter layer is integrally formed without being separated from each other.

In summary, when the color filter layer 120 is arranged in a striped configuration, R, G and B color filters may be arranged in a vertical direction. At this time, adjacent color filters are formed separated from one another on the black matrix in a horizontal direction. Meanwhile, because the same color filters are formed on the black matrix 110 in the vertical direction, they are not separated from one another but are integrally formed with one another.

Hereinafter, the present invention will be described with an example where the color filter layer is formed in a striped configuration in the vertical direction.

A compensation layer 130 is formed on the black matrix 110 and the color filter layer 120. The compensation layer 130 includes a plurality of compensation patterns 130a and 130b spaced apart from each other. The compensation patterns 130a and 130b function to compensate for an optical phase difference and at the same time serves as an overcoating layer to compensate for a height difference between the black matrix 110 and the color filter layer 120. The compensation patterns 130a and 130b may be formed of reactive mesogen that may compensate for light leakage.

The compensation patterns 130a and 130b are separated from each other on the black matrix 110 by a predetermined region 'P1'. In other words, the compensation patterns 130a and 130b are not integrally formed across all regions on the black matrix 110 but are formed by removing the predetermined region 'P1'. Because the compensation pattern is removed in the predetermined region 'P1', the compensation patterns 130a and 130b do not exist in the predetermined region 'P1'. As a result, the compensation patterns 130a and 130b on the black matrix are separated from one another by the predetermined region 'P1'. It is preferable that the predetermined region 'P1' corresponds to a column spacer 140 to be described later. The reason is as follows. If the region 'P1' has a size corresponding to a size of the column spacer 140, the compensation patterns 130a and 130b are not compressed by the column spacer 140, thereby preventing a blemish defect due to a recovery failure of the compensation patterns 130a and 130b that do not recover after being compressed.

The column spacer 140 for maintaining a cell gap between the first and second substrates 100 and 200 is formed on the first substrate 100 in the predetermined region 'P1' between the compensation patterns 130a and 130b.

In this case, the column spacer 140 has different contact positions in the vertical direction (region 'B' of FIG. 1) and in the horizontal direction (region 'C' of FIG. 1).

For example, in the case of the horizontal direction (region 'C' of FIG. 1), the column spacer 140 can locally contact the black matrix 110, the color filter layer 120 and the compensation patterns 130a and 130b. That is, in the case of the horizontal direction (region 'C' of FIG. 1), because the color filters of the color filter layer 120 are separated by a predetermined distance from one another and the compensation patterns 130a and 130b are separated by the predetermined region 'P1', the column spacer 140 passes through the predetermined region 'P1' between the compensation patterns 130a and 130b to locally contact both sidewalls of the color filter layer 120, and also passes through the predetermined distance to contact the black matrix 110. Also, because the column spacer 140 has a diameter at least larger than the predetermined region 'P1' between the compensation patterns 130a and 130b, the column spacer 140 contacts both upper edge surfaces of the compensation patterns 130a and 130b and is centered on the predetermined region 'P1 between the compensation patterns 130a and 130b.

In the case of the vertical direction (region 'B' of FIG. 1), the column spacer 140 contacts the color filter layer 120 and the compensation patterns 130a and 130b. That is, in the case of the vertical direction (region 'B' of FIG. 1), because the color filters of the color filter layer 120 are not separated from one another but are integrally formed with one another, the column spacer 140 passes through the predetermined region 'P1' between the compensation patterns 130a and 30b to locally contact the color filter layer 120. Also, because the column spacer 140 has a diameter at least larger than the predetermined region 'P1' between the compensation patterns 130a and 130b, the column spacer 140 contacts both upper edge surfaces of the compensation patterns 130a and 130b and is centered on the predetermined region 'P1 between the compensation patterns 130a and 130b.

It is preferable that the area where the column spacer 140 contacts the compensation pattern 130a and 130b is as small as possible. By doing so, because the compensation patterns 130a and 130b on the black matrix 110 are separated by the predetermined region 'P1' from each other and the column spacer 140 mainly contacts the color filter layer 120 or the black matrix 110, a blemish defect due to a recovery failure of the compensation patterns 130a and 130b that do not recover after being compressed can be prevented.

Meanwhile, the compensation patterns 130a and 130b are not formed in the edge region 'A' of the first and second substrates 100 and 200. For this purpose, the compensation patterns 130a and 130b formed on the edge region 'A' can be removed.

The seal pattern 400 directly contacts the first substrate 100 at the edge region 'A' where the compensation patterns 130a and 130b are not formed. Accordingly, the seal pattern 400 has a strong bond to the first substrate 100, thus preventing the seal pattern from bursting due to a contact failure of the seal pattern.

Meanwhile, gate lines (not shown) are arranged in the horizontal direction on the inner surface of the second substrate 200, and data lines (not shown) are arranged in the vertical direction crossing the gate lines. As the gate lines cross the data lines, a pixel region is defined. A thin film transistor 'Tr' is disposed around an area where the gate lines and the data lines cross, and a common line (not shown) is arranged in parallel with the gate lines within the pixel region. A plurality of common electrodes 212 branch from the common line. A pixel electrode 215 is connected to the thin film transistor 'Tr'. The pixel electrode 215 and the common electrode 212 are arranged in an alternating pattern.

The thin film transistor 'Tr' includes a gate electrode 211 branching from the gate line, a gate insulation layer 210 formed on the second substrate 200 including the gate electrode 211, an active layer 212 disposed on the gate insulation layer 210 corresponding to the gate electrode 211, and including a channel layer 212a and an ohmic contact layer 212b stacked thereon, and a source/drain electrode 213a/213b disposed on both edges of the active layer 212.

A passivation layer 220 is disposed on the second substrate 200 including the source/drain electrode 213a/213b. The pixel electrode 215 is disposed on the passivation layer 220, and the pixel electrode 215 and the common electrode 212 are arranged in turn.

When a predetermined voltage is applied between the common electrode 212 and the pixel electrode 215, a fringe field is formed between the common electrode 212 and the pixel electrode 215. The formed fringe field realigns the liquid crystal molecules to enhance the viewing angle.

However, when the IPS mode LCD device is in a dark state, light is leaked and thus a contrast ratio is lowered, which is problematic.

To solve this problem, the compensation patterns 130a and 130b are formed on the inner surface of the first substrate 100. The compensation patterns 130a and 130b can compensate light leakage leaked in the dark state of the inclined angle. The second substrate 200 adjusts the alignment of the liquid crystal molecules to enhance the viewing angle, thus enabling manufacture of an IPS mode LCD device that can improve the picture quality.

Also, the compensation patterns 130a and 130b on the black matrix 110 are separated by the predetermined region 'P1', and the column spacer 140 is formed on the predetermined region 'P1', thereby preventing a blemish defect due to a recovery failure of the compensation patterns 130a and 130b that do not recover after being compressed.

Also, because the column spacer 140 is formed on the black matrix 110 without being influenced by the compensation patterns 130a and 130b, a constant cell gap between the first and second substrates 100 and 200 may be stably maintained.

Further, because the compensation patterns 130a and 130b are not formed in the edge region 'A' of the first and second substrates 100 and 200 and thus the seal pattern 400 has a strong bond to the first substrate 100, thus preventing the seal pattern from bursting, due to a contact failure of the seal pattern.

Figure 2A:
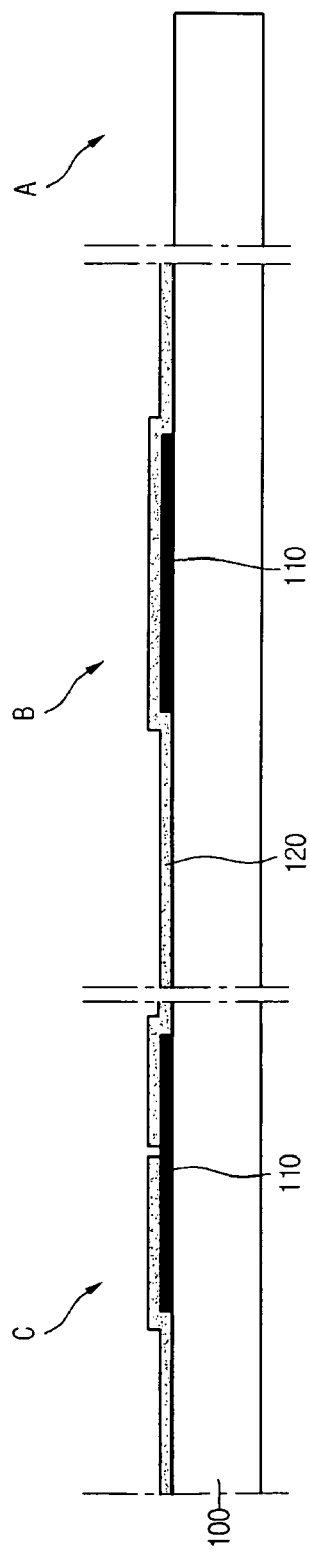
FIGS. 2A through 2E are schematic sectional views illustrating a process of manufacturing an IPS mode LCD device according to a first embodiment of the present invention.
Figure 2B:
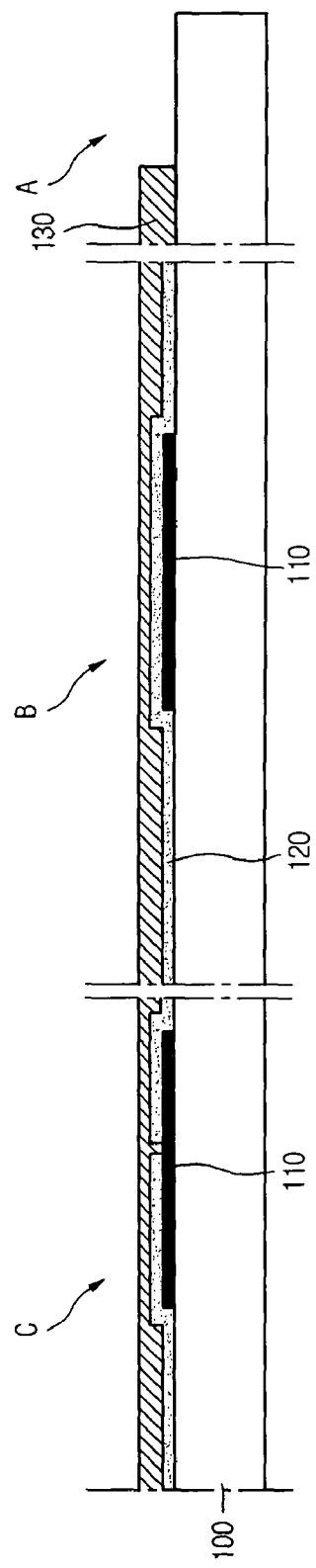

FIGS. 2A and 2B are schematic sectional views illustrating a process of manufacturing an IPS mode LCD device according to a first embodiment of the present invention.

Referring to FIG. 2A, a black matrix 110 and a color filter layer 120 are formed on a first substrate 100. The black matrix 110 is arranged corresponding to non-transmission regions of the display and thus it has a matrix configuration in which horizontal lines cross vertical lines. The color filter layer 120 is arranged in a striped configuration. If necessary, the color filters of the color filter layer 120 are arranged in the order of R, G and B or in the order of R, G, G and B. For example, the color filter layer is arranged between the vertical lines of the black matrix 110 in the horizontal direction, and some of the color filter layer 120 is formed partially overlapping vertical lines of the black matrix 110 on the black matrix 110. Accordingly, the color filter layer 120 on the vertical line of the black matrix 110 is arranged divided into two parts. Because the color filter layer 120 is arranged as one body in the vertical direction and passes over the horizontal lines of the black matrix 110, the color filter layer 120 is not divided on the horizontal lines of the black matrix 110 but is integrally formed.

The black matrix 110 may be formed by coating an opaque material film on the first substrate 100, exposing and developing the coated opaque material film, and hardening the developed opaque material film. The opaque material film may be formed of carbon black or titanium oxide. The color filter layer 120 may be formed by coating a photoresist film including a pigment for color display in a transmission region, exposing and developing the coated photoresist film, and hardening the developed photoresist film.

Referring to FIG. 2B, a compensation layer 130 is formed on the first substrate 100 including the black matrix 110 and the color filter layer 120. The compensation layer 130 may be formed of a material including a reactive mesogen by an ink jet method, a roll printing method, a screen printing method, a bar coating method and a spin coating method.

Thereafter, a mask is aligned over the compensation layer 130 and an exposure process is performed to irradiate light onto a predetermined region on the black matrix 110 and the edge region 'A' of the first substrate 100, i.e., a region except for the seal pattern region, thereby hardening corresponding portions of the compensation layer 130.

Figure 2C:
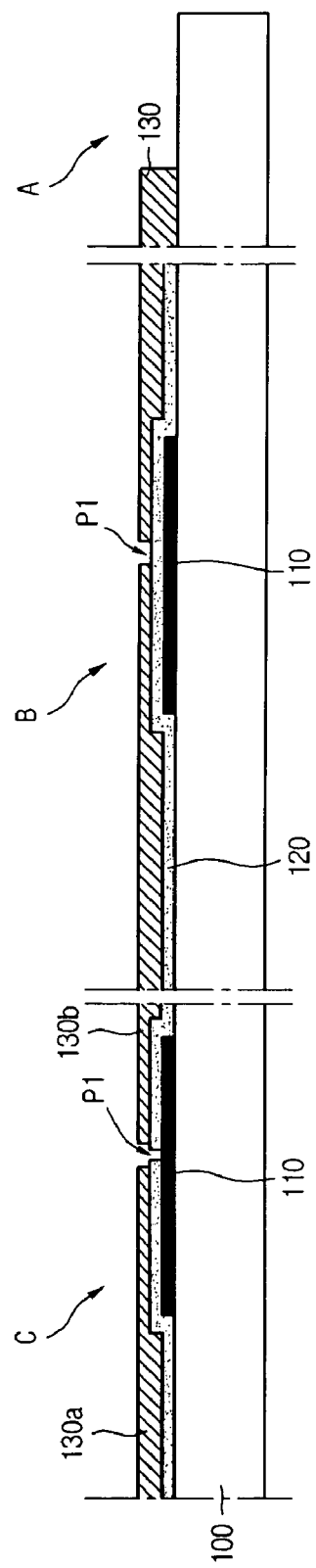

Referring to FIG. 2C, the compensation layer 130 is developed using a developing solution including acetone, ethanol, or poly glycidyl methacrylate (PGMA), so that the compensation layer 130 in the predetermined region on the black matrix 110 and the compensation layer 130 of the seal pattern region 'A' are removed to form a plurality of compensation patterns 130a and 130b.

Figure 2D:
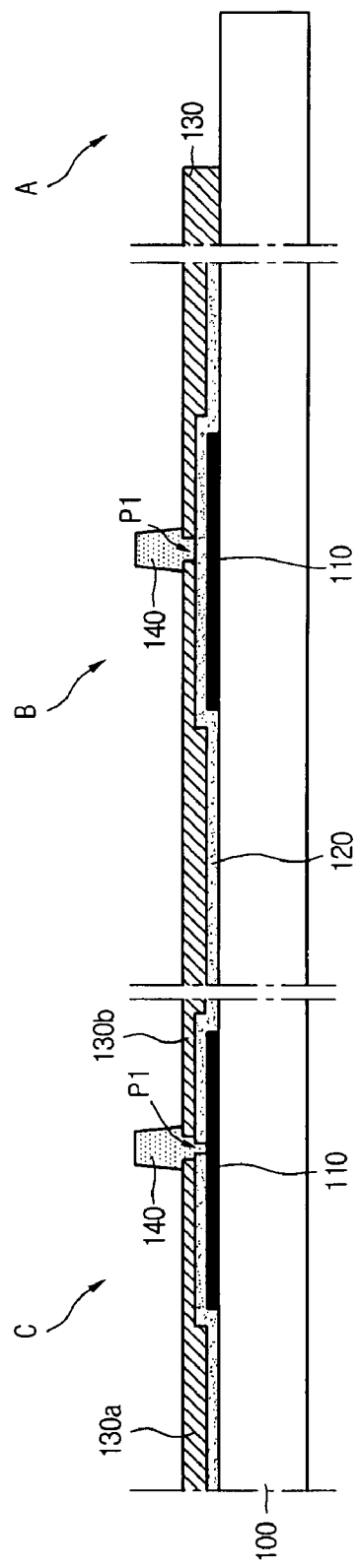

Referring to FIG. 2D, a photoresist film is coated on the first substrate 100 including the compensation patterns 130a and 130b and then patterned to form a column spacer 140. The column spacer 140 is formed in the predetermined region 'P1' between the compensation patterns 130a and 130b on the black matrix 110. Accordingly, the column spacer 140 passes through the predetermined region 'P1' between the compensation patterns 130a and 130b and is formed on the color filter layer 120. Alternatively, the column spacer 140 passes through the predetermined region 'P1' between the compensation patterns 130a and 130b and the predetermined spacing of the color filter layer and is formed on the black matrix 110.

Figure 2E:
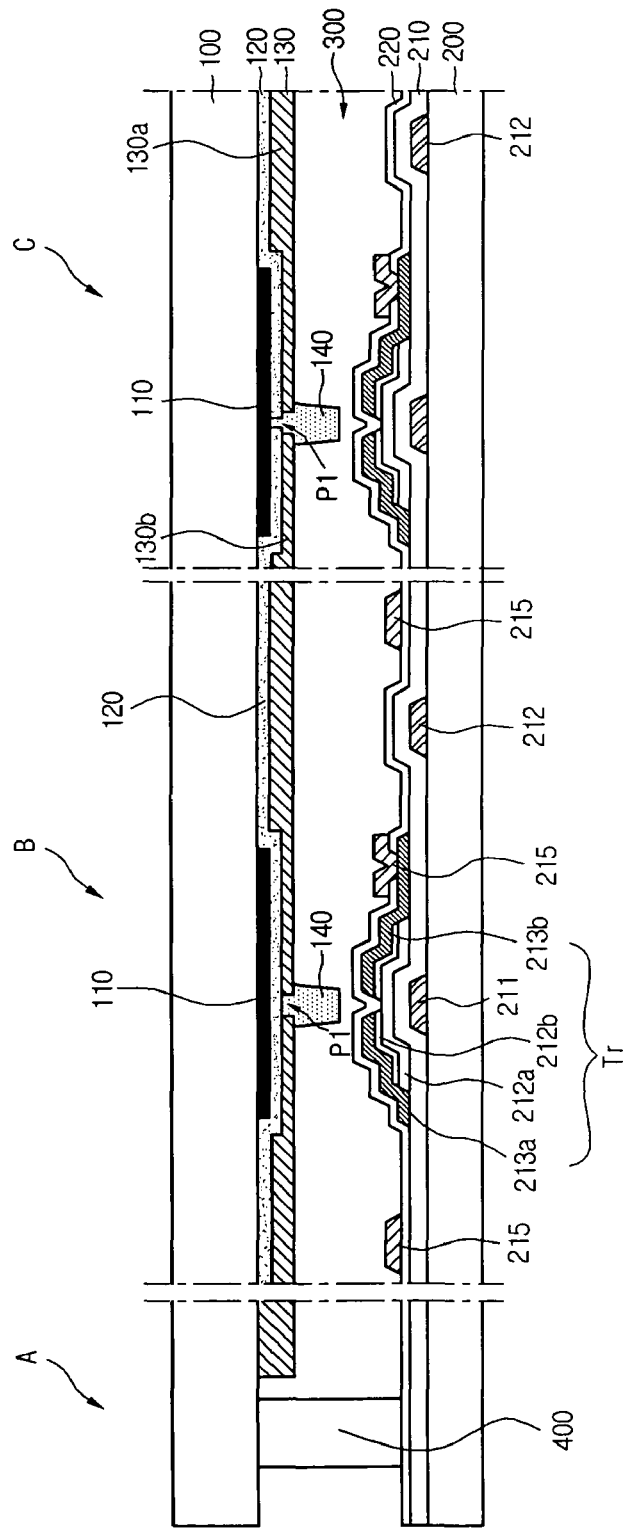

Referring to FIG. 2E, a second substrate 200 facing the first substrate 100 is provided.

The second substrate 200 includes a gate line, a data line crossing the gate line, a thin film transistor 'Tr' at a crossing point of the gate line and the data line, a common line (not shown) disposed in parallel with the gate line within a pixel region, a plurality of common electrodes 212 branching from the common line, and a pixel electrode 215 alternatively disposed with the common electrodes.

After a seal pattern is formed in the edge region 'A' of the first substrate 100 and the second substrate 200, the first substrate 100 and the second substrate 200 are attached, thus manufacturing an IPS mode LCD device.

Because the compensation patterns 130a and 130b are not formed in the edge region 'A' where the seal pattern is formed, the seal pattern can be attached to the first substrate 100 with a stronger adhesive force, thereby preventing a defect such as the seal pattern bursting.

Figure 3:
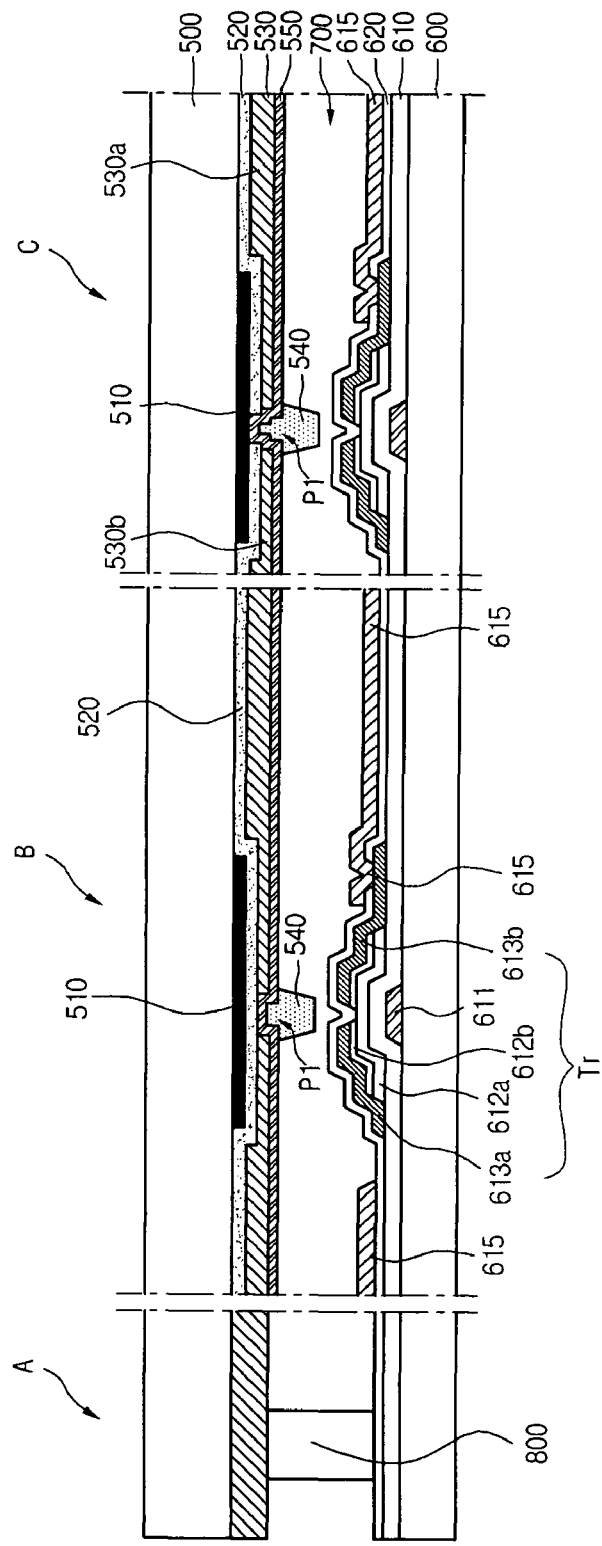
FIG. 3 is a sectional view of a TN mode LCD device according to a second embodiment of the present invention.

FIG. 3 is a sectional view of a TN mode LCD device according to a second embodiment of the present invention.

Referring to FIG. 3, first and second substrates 500 and 600 are spaced apart by a predetermined distance from each other, and a liquid crystal layer 700 is interposed between the first and second substrates 500 and 600. A seal pattern 800 is formed in an edge region (i.e., seal pattern region, 'A') of the first and second substrates 500 and 600. The first and second substrates 500 and 600 are attached to each other by the seal pattern 800.

On an inner surface of the first substrate 500 are formed a black matrix 510 and a color filter layer 520.

The black matrix 510 is arranged in a matrix configuration corresponding to a non-transmission region of the second substrate 600. The non-transmission region includes gate lines and data lines defining pixel regions of the second substrate 600, thin film transistors formed at a crossing of the gate line and the data line, and the edge region 'A'.

The color filter layer 520 is formed corresponding to a transmission region of the second substrate 600. The transmission region includes a plurality of pixel regions defined by the gate lines and the data lines. The color filter layer 520 has different colors corresponding to the respective pixel regions. The color filter layer 520 is formed corresponding to the pixel regions and is also formed partially overlapping the black matrix 510 on the black matrix 510. Accordingly, the color filter layer 520 on the black matrix 510 can be divided into first color filter layer and second color filter layer separated by a predetermined distance from each other that is shown in region 'C' of FIG. 3.

As shown in region 'B' of FIG. 3, when the color filter layer 520 is arranged in a striped configuration, the color filter layer 520 on the black matrix 510 has the same color and thus the color filter layer is integrally formed without being separated from each other.

In summary, when the color filter layer 520 is arranged in a striped configuration, R, G and B color filters may be arranged in a vertical direction. At this time, adjacent color filters are formed separated from one another on the black matrix in a horizontal direction. Meanwhile, because the same color filters are formed on the black matrix 510 in the vertical direction, they are not spaced from one another but are integrally formed with one another.

Hereinafter, the present invention will be described with an example where the color filter layer is formed in a striped configuration in the vertical direction.

A compensation layer 530 is formed on the black matrix 510 and the color filter layer 520. The compensation layer 530 includes a plurality of compensation patterns 530a and 530b. The compensation patterns 530a and 530b function to compensate for an optical phase difference and at the same time serves as an overcoating layer to compensate for a height difference between the black matrix 510 and the color filter layer 520. The compensation patterns 530a and 530b may be formed of reactive mesogen that may compensate light leakage.

The compensation patterns 530a and 530b are separated from each other on the black matrix 510 by a predetermined region 'P1'. In other words, the compensation patterns 530a and 530b are not integrally formed across all regions on the black matrix 510 but are formed by removing the predetermined region 'P1'. Because the compensation pattern is removed in the predetermined region 'P1', the compensation patterns 530a and 530b do not exist in the predetermined region 'P1'. As a result, the compensation patterns 530a and 530b on the black matrix are separated from one another by the predetermined region 'P1'.

A common electrode 550 is formed on the first substrate 500 including the compensation patterns 530a and 530b. The common electrode 550 may be formed of transparent indium tin oxide (ITO) or indium zinc oxide (IZO). Accordingly, the common electrode 550 on the black matrix 510 passes through the predetermined region 'P1' between the compensation patterns 530a and 530b and contacts the color filter layer (see region 'B' of FIG. 3), or the common electrode 550 on the black matrix 510 passes through the predetermined region 'P1' of the compensation patterns 530a and 530b and the predetermined spacing of the color filter layer 520 and contacts a top surface of the black matrix 510 (see region 'C' of FIG. 3).

Accordingly, the common electrode 550 on the black matrix 510 has a groove shape recessed toward the black matrix 510.

A column spacer 540 for maintaining a cell gap between the first and second substrates 500 and 600 is formed on the common electrode 550 corresponding to the predetermined region 'P1' between the compensation patterns 530a and 530b. Accordingly, the column spacer 540 is formed on the recessed groove of the common electrode 550 on the black matrix 510. Because the compensation patterns 530a and 530b are not formed at a lower portion of the recessed groove, a blemish defect due to a recovery failure where the compensation patterns 530a and 530b do not recover after being compressed can be prevented. Eventually, because the compensation patterns 530a and 530b are not influenced at all by the column spacer 540, the constant cell gap between the first and second substrates 500 and 600 may be stably maintained.

Meanwhile, the compensation patterns 530a and 530b are not formed in the edge region 'A' of the first and second substrates 500 and 600, the common electrode 550 is formed on the first substrate 500 and the seal pattern 800 is formed on the common electrode 550. Therefore, compared with the related art were the seal pattern is adhered to the compensation patterns with a weak adhesive force, the seal pattern 800 in the present invention adheres to the common electrode 550 with a stronger adhesive force, so that a defect such as a seal pattern burst can be prevented.

Meanwhile, the second substrate 600 includes a gate line (not shown) arranged in a first direction on an inner surface of the second substrate 600, a data line (not shown) arranged in a second direction substantially perpendicular to the gate line, a thin film transistor 'Tr' at a crossing of the gate line and the data line, and a pixel electrode 615 connected to a drain electrode 613b of the thin film transistor 'Tr'.

A plurality of insulation layers, e.g., a gate insulation layer 610 and passivation layer 620, are formed on the second substrate 600 to prevent the lines from being short-circuited.

Thus, the compensation patterns 530a and 530b that compensate for the optical phase difference are formed on the inner surface of the first substrate 500, so that a TN mode LCD device having an improved viewing angle can be manufactured.

Also, because the compensation patterns 530a and 530b are formed with an exposed column spacer region where an external force is concentrated, it is possible to maintain the constant cell gap between the first and second substrates 500 and 600.

While the above embodiment shows and describes an example of a TN mode LCD device, it can be applied to other LCD devices, such as a VA mode LCD device, an OCB mode LCD device, an STN mode LCD device and the like.

FIGS. 4A through 4D are schematic sectional views illustrating a process of manufacturing a TN mode LCD device according to a second embodiment of the present invention.

Figure 4A:
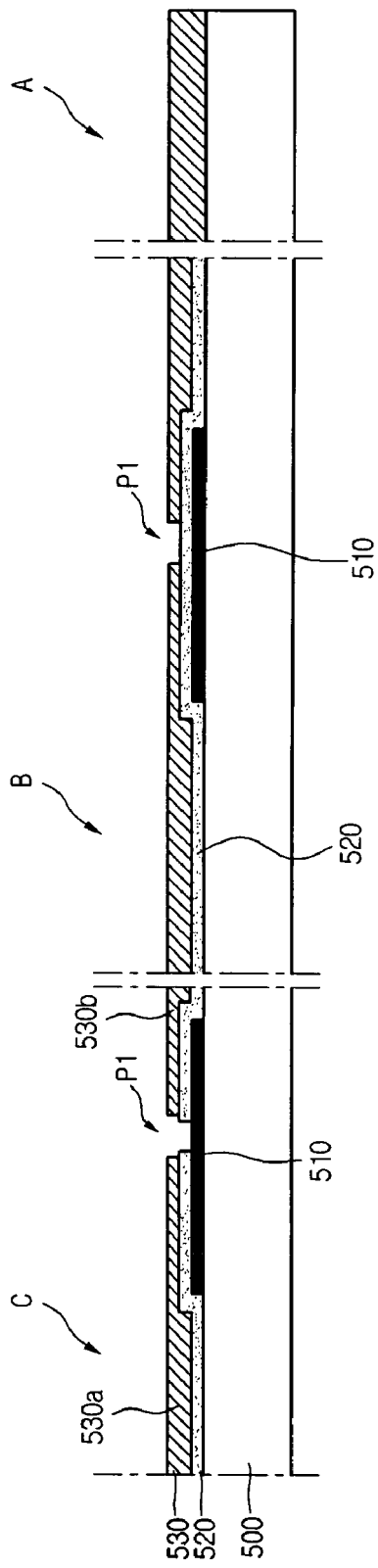
FIGS. 4A through 4D are schematic sectional views illustrating a process of manufacturing a TN mode LCD device according to a second embodiment of the present invention.

Referring to FIG. 4A, a black matrix 510 and a color filter layer 520 are formed on a first substrate 500. The black matrix 510 is arranged corresponding to non-transmission regions and thus it has a matrix configuration in which horizontal lines cross vertical lines. The color filter layer 520 is arranged in a striped configuration. If necessary, the color filters of the color filter layer 520 are arranged in the order of R, G and B or in the order of R, G, G and B. For example, the color filter layer is arranged between the vertical lines of the black matrix 510 in the horizontal direction, and some of the color filter layer 520 is formed partially overlapping vertical lines of the black matrix 510 on the black matrix 510. Accordingly, the color filter layer 520 on the vertical line of the black matrix 510 is arranged divided into two parts. Because the color filter layer 520 is arranged as one body in the vertical direction and passes over the horizontal lines of the black matrix 510, the color filter layer 520 is not divided on the horizontal lines of the black matrix 510 but is integrally formed.

The black matrix 510 may be formed by coating an opaque material film on the first substrate 500, exposing and developing the coated opaque material film, and hardening the developed opaque material film. The opaque material film may be formed of carbon black or titanium oxide. The color filter layer 520 may be formed by coating a photoresist film including a pigment for color display in a transmission region, exposing and developing the coated photoresist film, and hardening the developed photoresist film.

Thereafter, a plurality of compensation patterns 530a and 530b are formed by removing a predetermined region 'P1' of a compensation layer 530 formed over the black matrix 510. The compensation layer 530 may be formed of a material including a reactive mesogen by an ink jet method, a roll printing method, a screen printing method, a bar coating method and a spin coating method.

Thereafter, a mask is aligned over the compensation layer and an exposure process is performed to irradiate light onto a predetermined region on the black matrix 510 and the edge region 'A' of the first substrate 500, i.e., a region except for the seal pattern region, thereby hardening the regions.

Thereafter, the compensation layer is developed using a developing solution including acetone, ethanol, or poly glycidyl methacrylate (PGMA), so that the compensation layer 530 in the predetermined region on the black matrix 510 and the compensation layer 530' of the seal pattern region 'A' are removed to form compensation patterns 530a and 530b.

Figure 4B:
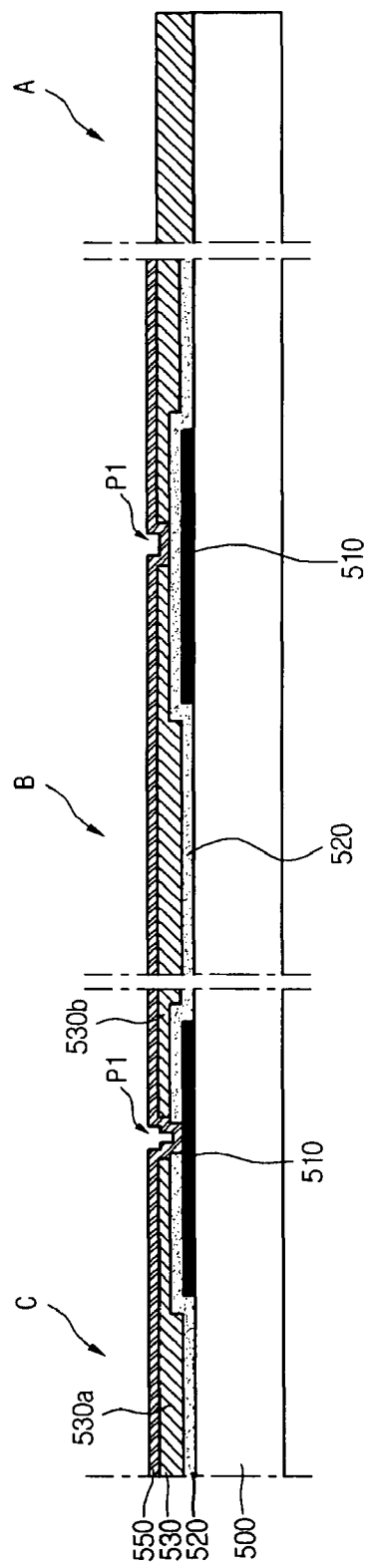

Referring to FIG. 4B, a common electrode 550 is formed on the first substrate 500 including the compensation patterns 530a and 530b. The common electrode 550 may be formed of transparent indium tin oxide (ITO) or indium zinc oxide (IZO) by a sputtering method. Accordingly, the common electrode 550 on the black matrix 510 passes through the predetermined region 'P1' between the compensation patterns 530a and 530b and contacts the color filter layer (see region 'B' of FIG. 3), or the common electrode 550 on the black matrix 510 passes through the predetermined region 'P1' between the compensation patterns 530a and 530b and the predetermined spacing of the color filter layer 520 and contacts a top surface of the black matrix 510 (see region 'C' of FIG. 3). The common electrode 550 on the black matrix 510 may have a groove shape recessed toward the black matrix 510 because the compensation patterns 530a and 530b do not exist at the predetermined region 'P1'.

Figure 4C:
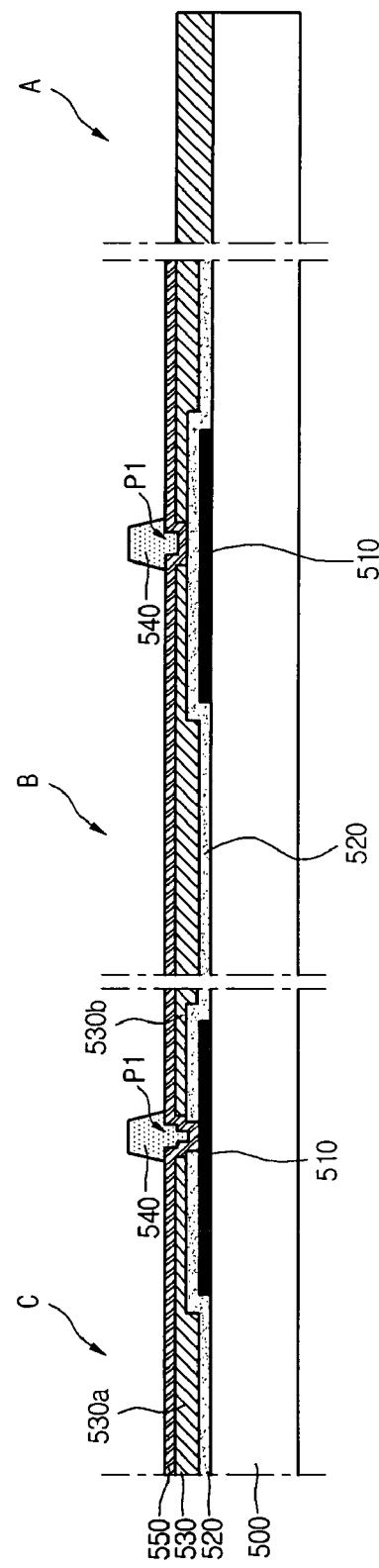

Referring to FIG. 4C, a photoresist film is coated on the common electrode 550 and then patterned to form a column spacer 540. The column spacer 540 is formed extending to the recessed groove region of the common electrode 550 on the black matrix 510. Because the compensation patterns 530a and 530b are not formed in the groove region, a blemish defect due to a recovery failure where the compensation patterns 530a and 530b do not recover after being compressed can be prevented.

Figure 4D:
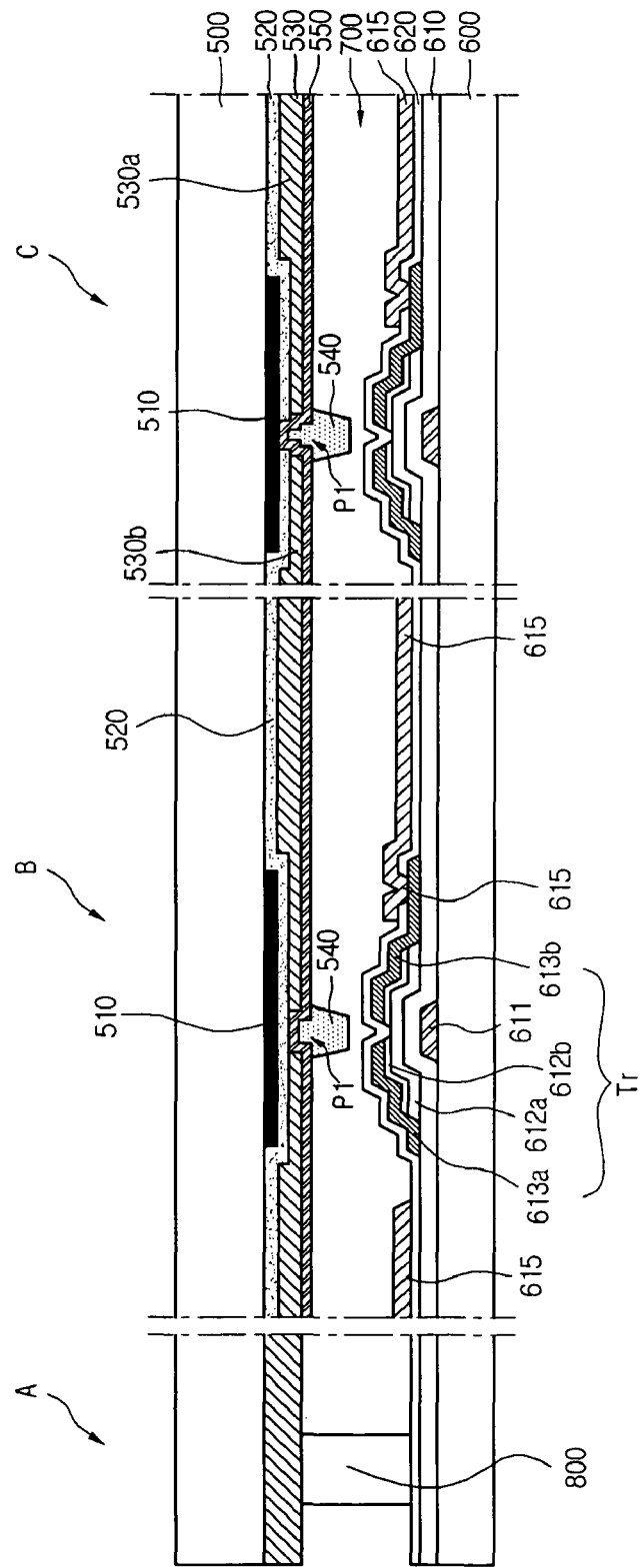

Referring to FIG. 4D, a second substrate 600 facing the first substrate 500 is provided.

The second substrate 600 includes a gate line, a data line crossing the gate line, a thin film transistor 'Tr' at a crossing of the gate line and the data line, and a pixel electrode 615 electrically connected with a drain electrode of the thin film transistor 'Tr'.

After a seal pattern is formed in the edge region 'A' of the first substrate 500 and the second substrate 600, the first substrate 500 and the second substrate 600 are attached, thus manufacturing a TN mode LCD device.

The compensation patterns 530a and 530b are not formed in the edge region 'A' of the first and second substrates 500 and 600, the common electrode 550 is formed directly on the first substrate 500, and the seal pattern is formed directly on the common electrode 550. Therefore, compared with the related art where the seal pattern is adhered to the compensation pattern with a weak adhesive force, the seal pattern 800 in the present invention adheres to the common electrode 550 with a stronger adhesive force, and a defect such as a seal pattern burst can be prevented.

According to the above embodiments of the present invention, the compensation patterns compensating for a phase difference and a height difference between the black matrix and the color filter layer at the same time are formed, thus enhancing the viewing angle.

Also, because the compensation patterns are formed directly on the substrate unlike in the related art where a compensation film is separately manufactured and attached, a thin LCD device may be implemented.

Further, because the compensation patterns are removed from the column spacer region, it is possible to stably maintain a cell gap between two substrates.

Furthermore, because the compensation patterns are removed from the seal pattern region, a seal pattern burst can be prevented.

As described above, the compensation patterns are formed on an inner surface of a substrate, thus enhancing the viewing angle, decreasing contamination due to foreign particles, and providing a slim LCD device.

Also, a burst defect of the seal pattern which may be caused when the compensation patterns are formed on an inner surface of a substrate is improved, thus providing an LCD device that may stably maintain the cell gap between two substrates.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
    a first substrate;
    a black matrix formed in a matrix configuration on the first substrate;
    a compensation layer capable of compensating the optical phase difference disposed above the black matrix and including a plurality of compensation patterns separated by a predetermined region from each other where the compensation layer has been removed;
    a color filter layer disposed between patterns of the black matrix; and
    a column spacer disposed in a region including at least the predetermined region,
    wherein the color filter layer has a stripe configuration,
    wherein the color filter layer comprises color filters spaced apart by a predetermined interval from one another in a first direction on the black matrix,
    wherein the column spacer contacts the black matrix through the predetermined region of the compensation patterns and the predetermined interval of the color filter layer,
    wherein the color filter layer covers an overall portion of an upper surface of the black matrix in a second direction,
    wherein the column spacer contacts the color filter layer through the predetermined region of the compensation patterns and
    wherein the column spacer is formed on the predetermined region and a partial region of the compensation patterns.

2. The liquid crystal display device according to claim 1, further comprising:
    a second substrate disposed facing the first substrate; and
    a seal pattern formed in an edge region of the first and second substrates.

3. The liquid crystal display device according to claim 2, wherein the compensation patterns are not formed on the first substrate corresponding to the edge region.

4. The liquid crystal display device according to claim 2, further comprising a pixel electrode and a common electrode formed on the second substrate, wherein the seal pattern is directly formed on the first substrate.

5. The liquid crystal display device according to claim 2, further comprising:
    a common electrode formed on the compensation patterns of the first substrate; and
    a pixel electrode formed on the second substrate,
    wherein the seal pattern is formed on the common electrode.

6. The liquid crystal display device according to claim 5, wherein the common electrode includes a groove recessed toward the black matrix, and the column spacer is formed on the groove of the common electrode.

7. The liquid crystal display device according to claim 1, wherein the compensation patterns are formed of a reactive mesogen.

8. A liquid crystal display device comprising:
    a first substrate;
    a black matrix formed in a matrix configuration on the first substrate;
    a compensation layer capable of compensating the optical phase difference disposed above the black matrix and including a plurality of compensation patterns separated by a predetermined region from each other where the compensation layer has been removed;
    a column spacer disposed in a region including at least the predetermined region;
    a second substrate disposed facing the first substrate;
    a liquid crystal layer interposed between the first substrate and the second substrate, and
    a color filter layer disposed between patterns of the black matrix,
    wherein the second substrate includes a pixel electrode and a common electrode alternately arranged thereon;
    wherein the color filter layer has a stripe configuration,
    wherein the color filter layer comprises color filters spaced apart by a predetermined interval from one another in a first direction on the black matrix,
    wherein the column spacer contacts the black matrix through the predetermined region of the compensation patterns and the predetermined interval of the color filter layer, wherein the color filter layer covers an overall portion of an upper surface of the black matrix in a second direction, wherein the column spacer contacts the color filter layer through the predetermined region of the compensation patterns and wherein the column spacer is formed on the predetermined region and a partial region of the compensation patterns.

9. The liquid crystal display device according to claim 8, further comprising a seal pattern formed in an edge region of the first and second substrates.

10. The liquid crystal display device according to claim 9, wherein the compensation patterns are not formed on the first substrate corresponding to the edge region.

11. The liquid crystal display device according to claim 9, wherein the seal pattern is directly formed on the first substrate.

12. The liquid crystal display device according to claim 8, wherein the compensation patterns are formed of a reactive mesogen.

* * * * *